(12) United States Patent (10) Patent No.: US 8,972,147 B2
Taneyhill et al. (45) Date of Patent: Mar. 3, 2015

(54) ACC AND AM BRAKING RANGE VARIABLE BASED ON INTERNAL AND EXTERNAL FACTORS

(75) Inventors: David J. Taneyhill, Elyria, OH (US); Andrew J. Pilkington, Avon Lake, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 625 days.

(21) Appl. No.: 13/170,529

(22) Filed: Jun. 28, 2011

(65) Prior Publication Data

US 2012/0176234 A1 Jul. 12, 2012

Related U.S. Application Data

(63) Continuation-in-part of application No. 12/987,369, filed on Jan. 10, 2011, now Pat. No. 8,543,309.

(51) Int. Cl.
*B60W 30/16* (2012.01)
*B60K 31/00* (2006.01)
(Continued)

(52) U.S. Cl.
CPC ......... *B60K 31/0008* (2013.01); *B60K 31/0066* (2013.01); *B60K 2031/0041* (2013.01); *B60K 2310/262* (2013.01); *B60K 2310/264* (2013.01); *B60W 10/06* (2013.01); *B60W 10/184* (2013.01); *B60W 10/18* (2013.01); *B60W 30/16* (2013.01); *B60W 2520/14* (2013.01); *B60W 2540/18* (2013.01); *B60W 2550/146* (2013.01); *B60W 2550/20* (2013.01); *B60W 2550/302* (2013.01);
(Continued)

(58) Field of Classification Search
USPC ............................................................ 701/96
See application file for complete search history.

(56) References Cited

U.S. PATENT DOCUMENTS

| 4,964,679 | A | 10/1990 | Rath et al. |
| 5,699,040 | A | 12/1997 | Matsuda |

(Continued)

FOREIGN PATENT DOCUMENTS

| DE | 103 07 169 A1 | 9/2004 |
| DE | 10 2005 036 049 A1 | 2/2007 |

(Continued)

OTHER PUBLICATIONS

Bendix Service Data, Bendix Wingman ACB (Active Cruise with Braking), SD-13-3333, 8 pgs.

(Continued)

*Primary Examiner* — Shelley Chen
(74) *Attorney, Agent, or Firm* — Fay Sharpe LLP

(57) ABSTRACT

When employing an adaptive cruise-with-braking (ACB) system to control host vehicle braking reaction distance, a plurality of trigger conditions (e.g., environmental parameters) are monitored. If one or more of the monitored parameters exceeds a predefined threshold, a trigger event is detected, and at least one of a braking reaction distance (BRD) and a following distance limit shape (FDLS) are adjusted. The BRD and FDLS adjustments may be predefined according to the type and/or magnitude of the trigger event. Trigger events may be weighted or prioritized such that higher priority trigger event types correspond to larger BRD reductions, etc. Monitored trigger conditions may include adverse weather, dangerous road terrain or topography, high traffic density, erratic forward vehicle behavior, and the like.

20 Claims, 15 Drawing Sheets

(51) Int. Cl.
*B60W 10/06* (2006.01)
*B60W 10/184* (2012.01)
*B60W 10/18* (2012.01)

(52) U.S. Cl.
CPC .... *B60W 2550/306* (2013.01); *B60W 2550/402* (2013.01)
USPC ............................................ 701/96; 701/301

(56) References Cited

U.S. PATENT DOCUMENTS

| | | | |
|---|---|---|---|
| 5,850,176 | A | 12/1998 | Kinoshita et al. |
| 5,959,569 | A | 9/1999 | Khodabhai |
| 6,134,497 | A | 10/2000 | Hayashi et al. |
| 6,154,168 | A | 11/2000 | Egawa et al. |
| 6,175,799 | B1 | 1/2001 | Tsutsumi et al. |
| 6,208,106 | B1 | 3/2001 | Sielagoski et al. |
| 6,230,093 | B1 | 5/2001 | Michi et al. |
| 6,304,808 | B1 | 10/2001 | Milot |
| 6,345,227 | B1 | 2/2002 | Egawa et al. |
| 6,470,986 | B2 | 10/2002 | Fuchs et al. |
| 6,498,967 | B1 | 12/2002 | Hopkins |
| 6,546,327 | B2 | 4/2003 | Hattori et al. |
| 6,591,180 | B1 | 7/2003 | Steiner |
| 6,753,804 | B2 | 6/2004 | Miyahara |
| 6,795,765 | B2 | 9/2004 | Miyahara |
| 7,100,726 | B2 | 9/2006 | Kim |
| 7,133,760 | B2 | 11/2006 | Glora |
| 7,228,220 | B2 | 6/2007 | Uhler et al. |
| 7,739,023 | B2 | 6/2010 | Lee |
| 2004/0238249 | A1* | 12/2004 | Kim ............................ 180/169 |
| 2007/0106431 | A1 | 5/2007 | Tsuzuki et al. |
| 2009/0204304 | A1 | 8/2009 | Urban et al. |
| 2009/0271084 | A1 | 10/2009 | Taguchi |
| 2011/0015818 | A1* | 1/2011 | Breuer et al. .................... 701/29 |

FOREIGN PATENT DOCUMENTS

| | | |
|---|---|---|
| DE | 10 2008 003 205 A1 | 7/2009 |
| WO | WO 02/20296 | 3/2002 |

OTHER PUBLICATIONS

Bendix Service Data, Bendix Wingman ACB (Active Cruise with Braking), SD-13-3333, 30 pgs., BW2774 © 20010, Bendix Commercial Systems, LLC, Jan. 2010.

Office Action of corresponding German Application No. 102012012829, dated Oct. 26, 2013, 7 pages.

\* cited by examiner

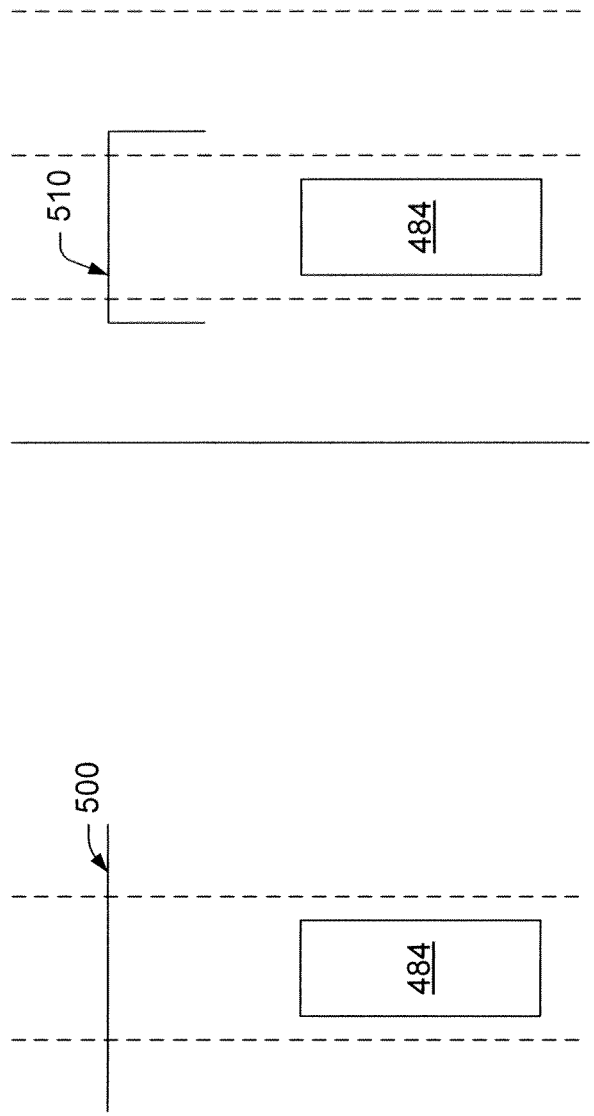

ACC AND AM BRAKING RANGE VARIABLE BASED ON INTERNAL AND EXTERNAL FACTORS

CROSS-REFERENCE TO RELATED APPLICATIONS

This application is a continuation-in-part of, and claims priority to, U.S. patent application Ser. No. 12/987,369, filed on Jan. 10, 2011, and entitled ACC AND AM BRAKING RANGE VARIABLE BASED ON LATERAL AND LONGITUDINAL POSITION OF FORWARD VEHICLE AND CURVATURE OF ROAD. The foregoing application is incorporated by reference in its entirety herein.

BACKGROUND

The present application finds particular application in cruise-control systems in vehicles, particularly involving adaptive cruise-with-braking (ACB) systems. However, it will be appreciated that the described technique may also find application in other motor control systems, other vehicle systems, or other cruise control vehicle systems.

Some conventional ACB systems relate to determining whether a forward vehicle is in the same lane as a host vehicle. If so, then brakes may be activated as a function of the position of the forward vehicle relative to the host vehicle. Such systems base a braking reaction on a single, longitudinal threshold event. Other systems use a reference azimuth angle. The angle of the target vehicle from the reference azimuth is measured. If the target vehicle angle is within a certain angle, the radar system determines that the target vehicle is in the path of the host vehicle and may set a collision warning.

Other approaches attempt to determine whether deceleration of the host vehicle should remain the same when the target vehicle is lost, or determining a future course of the host vehicle based on the position of the target vehicle. Still other techniques limit a braking pressure according to a target deceleration variable after detecting the distance to and the velocity of the target vehicle or determine whether the target vehicle is moving through a curve or changing lanes. Such systems use the relative velocity and measured angle to determine whether the target vehicle should remain the target vehicle. Other systems determine whether a forward vehicle is in a curve or made a lane change. If the forward vehicle made a lane change, the host vehicle returns to its preset cruise control speed. However, such conventional approaches fail to consider the lateral offset of the target vehicle or the curvature of the road as it pertains to following distance of the host vehicle.

The present innovation provides new and improved ACB systems and methods that permit the ACB system to modify a braking range limit for foundation braking in a host vehicle as a function of one or more trigger events detected by the host vehicle, which overcome the above-referenced problems and others.

SUMMARY

In accordance with one aspect, an adaptive cruise-with-braking (ACB) system that facilitates modifying or adjusting a braking reaction distance as a function of a detected trigger event comprises a sensor on a host vehicle that detects a forward vehicle, and a deceleration system that executes one or more deceleration requests. The system further comprises a controller having a memory that stores, and a processor that executes, computer-executable instructions for setting an initial braking reacting distance (BRD), defining a following distance limit shape (FDLS) as a function of a lateral offset function, monitoring one or more trigger conditions, and detecting a trigger event. The instructions further comprise at least one of adjusting the BRD by a predetermined distance and adjusting the shape of the FDLS, as a function of the type of trigger event detected.

In accordance with another aspect, a method for modifying or adjusting a braking reaction distance as a function of a detected trigger event comprises setting an initial braking reacting distance (BRD), defining a following distance limit shape (FDLS) as a function of a lateral offset function, monitoring one or more trigger conditions, and detecting a trigger event. The method further comprises at least one of adjusting the BRD by a predetermined distance and adjusting the shape of the FDLS, as a function of the type of trigger event detected.

In accordance with another aspect, a method of reducing an allowable braking reaction distance (BRD) for a host vehicle as a function of a detected trigger event, comprises setting an initial BRD for the host vehicle, monitoring one or more trigger conditions, and detecting a trigger event. The method further comprises reducing the BRD by a predefined amount that corresponds to the type of trigger event that is detected.

One advantage is that host vehicle and forward vehicle safety is improved.

Another advantage is that false positive alerts are reduced, thereby reducing desensitization of the driver to the alerts.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

FIG. 15A shows a symmetric FDLS that can be employed when no trigger events are detected by the host vehicle.

FIG. 15B shows a symmetric FDLS that can be employed when an ABS, traction, and/or stability event is detected by the host vehicle.

DETAILED DESCRIPTION

Figure 1:
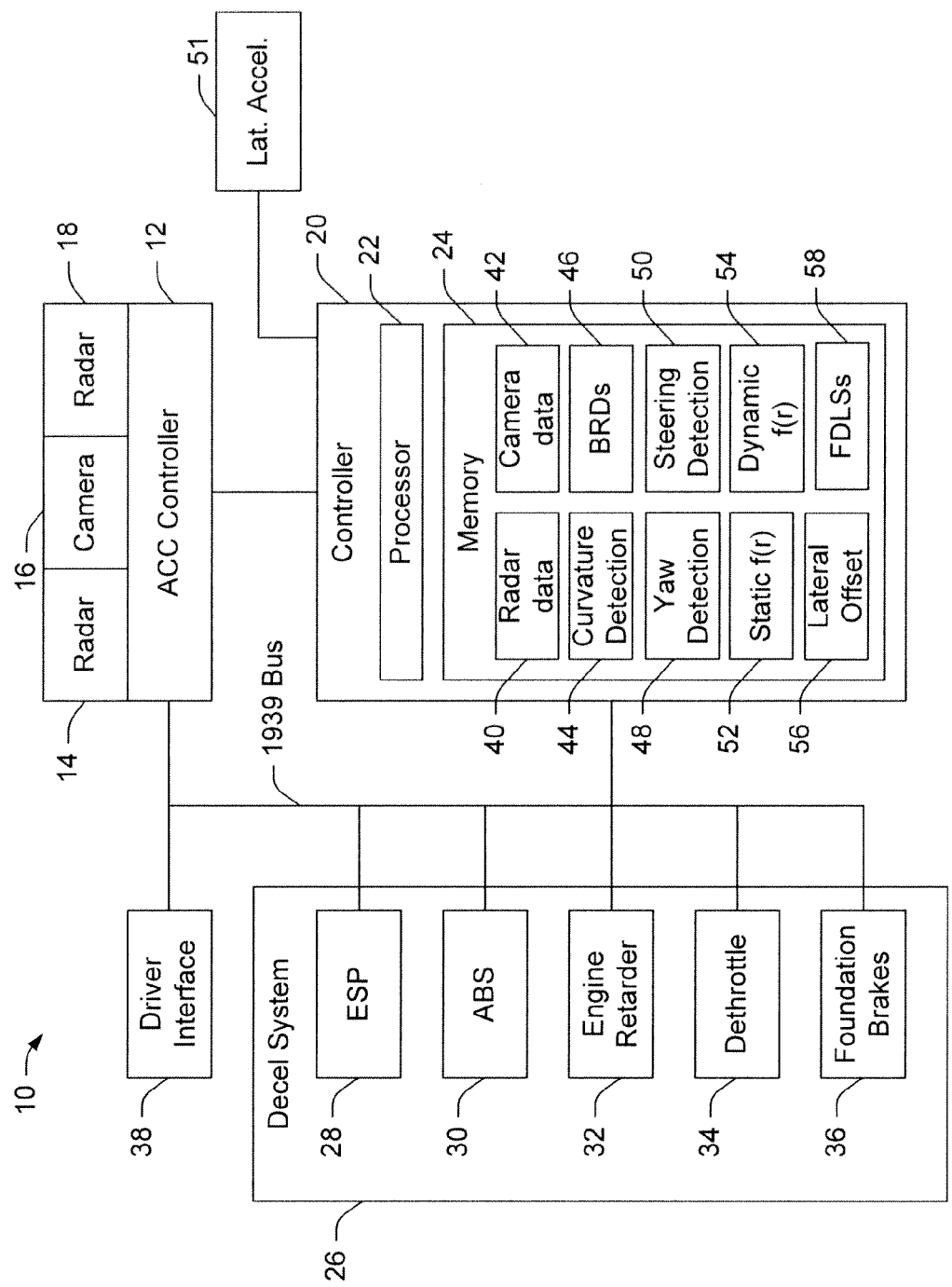
FIG. 1 illustrates an adaptive cruise-with-brake (ACB) system that facilitates modifying or adjusting a braking range limit as a function of lateral offset of a forward vehicle, road curvature, or both.

FIG. 1 illustrates an adaptive cruise-with-brake (ACB) system 10 that facilitates modifying or adjusting a braking range limit as a function of lateral offset of a forward vehicle, road curvature, or both. As used herein, "following distance," "braking reaction distance," "braking range limit," and the like may refer to a following window or time period (e.g., 2 seconds, 3.2 seconds, etc.) that the host vehicle maintains behind the target or forward vehicle, and is not to be construed as being limited to a static distance (e.g., 200 yards) or the like, since distance or range may change with host vehicle speed.

The system 10 includes an adaptive cruise control (ACC) module 12 that is coupled to a radar sensor 14 that detects objects on the road in front of the host vehicle to which it is mounted. The radar sensor 14 emits a radar signal that is reflected off of forward objects back to the radar sensor. Based on various characteristics of the reflected signal, the radar sensor identifies the forward object as a forward vehicle that warrants tracking or a non-vehicle object (e.g., a road sign, an aluminum can on the shoulder, etc.) that may be dismissed. The ACC module 12 may also be coupled to a camera sensor 16 that detects forward objects, and optionally to a second radar sensor 18 that operates in the same manner as the radar sensor 14. The camera sensor captures an image of a forward object and compares various properties of the image (e.g., pixel and contrast information, etc.) to stored images to determine whether the forward object is a vehicle that warrants tracking or a non-vehicle object that may be dismissed.

The ACC module 12 is communicatively coupled to a controller 20 that comprises a processor 22 that executes, and a memory 24 that stores, computer-executable instructions, algorithms, processes, programs, etc., for performing the various functions and methods described herein. The ACC 12 and controller 20 are further communicatively coupled to a deceleration system 26 that comprises a electronic stability program (ESP) module 28, an antilock brake system (ABS) module 30, an engine retarder 32, an engine dethrottling program or module 34, and foundation brakes 36. The brake system 26, ACC 12, and controller 20 are also communicatively coupled to a driver interface 38 (e.g., a graphical user interface or the like), via which alerts and/or instructions related to forward vehicle status, host vehicle braking, etc., are provided to a driver.

The memory stores radar data 40 related to detected forward vehicles and received from the radar sensors, and/or camera data 42 related to detected forward vehicles and received from the camera sensor. The memory stores, and the processor executes, a road curvature detection algorithm 44 (e.g., computer-executable instructions) for determining a curvature of the road on which the host vehicle (i.e., the vehicle in which the system 10 is installed) is driving. If the processor 22 determines that the curvature of the road is greater than a predetermined threshold, then a braking reaction distance (BRD) limit 46 is adjusted to account for the road curvature. The BRD 46 is a distance limit (e.g.: a static distance, such as 85 meters; a temporal distance, such as 2.5 seconds; etc.) that, when breached by a forward vehicle, permits the controller 20 to request a braking reaction, in addition to one or more of engine retardation and dethrottling. The BRD may be viewed as a maximum distance at which the foundation brakes are allowed to be implemented (e.g., at which a deceleration request is permitted to be sent to the foundation brakes). Beyond this distance, other forms of deceleration may be optionally permitted, such as engine retardation and dethrottling.

Curvature of the road may be detected or determined as a function of radar data 40 and/or camera data 42. Additionally, the memory 24 stores, and the processor 22 executes, a yaw detection algorithm 48 that analyzes yaw of the host vehicle, and a steering detection algorithm 50 that analyzes steering information (e.g., whether the host vehicle is being steered to follow a curve or the like) to determine road curvature. In another embodiment, the system 10 includes a lateral accelerometer 51 that provides data to the processor for road curvature detection.

The braking reaction may increase in severity or magnitude as a function of the speed with which the host vehicle is overtaking or approaching the forward vehicle. For instance, if a forward vehicle has just breached the BRD but slowly, then the controller 20 sends a deceleration command to the dethrottling module 34 to reduce host vehicle speed. If the forward vehicle is decelerating quickly, as determined from the radar and/or camera data, then the controller 20 sends a deceleration command to the engine retarder 22 to further reduce host vehicle speed. If the forward vehicle has fully applied its brakes and is decelerating rapidly, then the controller 20 sends a deceleration command to the foundation brakes 26 to initiate rapid deceleration of the host vehicle. The magnitude of the deceleration request or command sent to any of the dethrottling module, the engine retarder, and/or the foundation brakes is variable as a function of the deceleration of the forward vehicle.

The memory 24 stores a static radius function 52 that defines a radius of curvature below which the processor will reduce the BRD for the host vehicle. The memory also stores a dynamic radius function 54 that a radius of curvature below which the processor will reduce the BRD for the host vehicle, wherein the size of the radius of curvature is a function of vehicle speed such that at higher speeds the radius of curvature that triggers a braking response is smaller, and vice versa. For instance, if the BRD is initially set to 85 meters (or some other initial BRD) for a host vehicle traveling at highway speed (e.g., 55-75 mph or the like), and the detected radius of curvature of the road is less than a radius of curvature defined by the static (or dynamic) radius function, then the processor reduces the BRD to 65 meters (or some other predefined reduced BRD).

According to another example, if the host vehicle is on a curve on a highway, behind a forward vehicle that is on an exit ramp, the forward vehicle may appear to be directly ahead of the host vehicle. As the forward vehicle decelerates on the exit ramp, it may breach the initial BRD, triggering a braking reaction in the host vehicle and an alert to the driver. However, by detecting that the host vehicle is on a curve, and therefore not following the forward vehicle straight ahead of it, the processor 22 is able to trigger a BRD reduction so that the forward vehicle on the exit ramp does not trigger a deceleration request in the host vehicle, which remains on the highway. This feature reduces false positive alerts to the driver, which in turn reduces driver desensitization to the braking alerts provided via the driver interface 38. Additionally, this feature improves fuel economy by reducing unnecessary braking reactions in the host vehicle.

According to another example, the BRD is lessened when the radar or camera sensor information indicates that a forward vehicle is on an exit ramp while the host vehicle is either continuing to go straight or curving in the opposite direction. The processor 20 uses the host vehicle yaw and/or steering angle to create a coefficient used in the calculation of the reduction of the braking range limit, which can be set anywhere between two predefined limits (e.g., 60 m and 85 m).

In another embodiment, the memory 24 stores a lateral offset function 56 that defines a following distance limit shape (FDLS) 58 (see, e.g., FIGS. 2 and 3) that accounts for forward vehicles breaching the BRD from a lateral direction (e.g., changing lanes and entering the host vehicle's lane at a distance less than the BRD, etc.). The shape or size of the following distance limit shape is variable as a function of host vehicle speed. For instance, the braking range limit can be modified when the lateral offset of the forward vehicle is greater than the predefined lateral offset function 56. In one embodiment, the lateral offset function 56 establishes a cone shaped FDLS, such that if the target vehicle is outside the "cone" and the longitudinal distance is between, e.g., 55 m and 85 m, the deceleration limit requirement remains unchanged, as if the forward vehicle were farther than 85 m. These features minimize false braking interventions. It will be understood that when a forward vehicle is outside the FDLS 58 defined by the lateral offset function 56, dethrottle and engine retarder requests may be made. If the forward vehicle breaches or enters the FLDS 58, then foundation brake requests are also permitted, in addition to requests for dethrottling and engine retardation.

In accordance with various features described herein, if there is an active deceleration request but the forward vehicle is outside the FDLS 58, then the controller is not permitted to request braking but may still request dethrottling and retarder deceleration. If there is no active deceleration request, but the forward vehicle is inside the FDLS 58, then braking may be requested by the controller, in addition to dethrottle and engine retardation, if and when a deceleration request is made.

Figure 2:
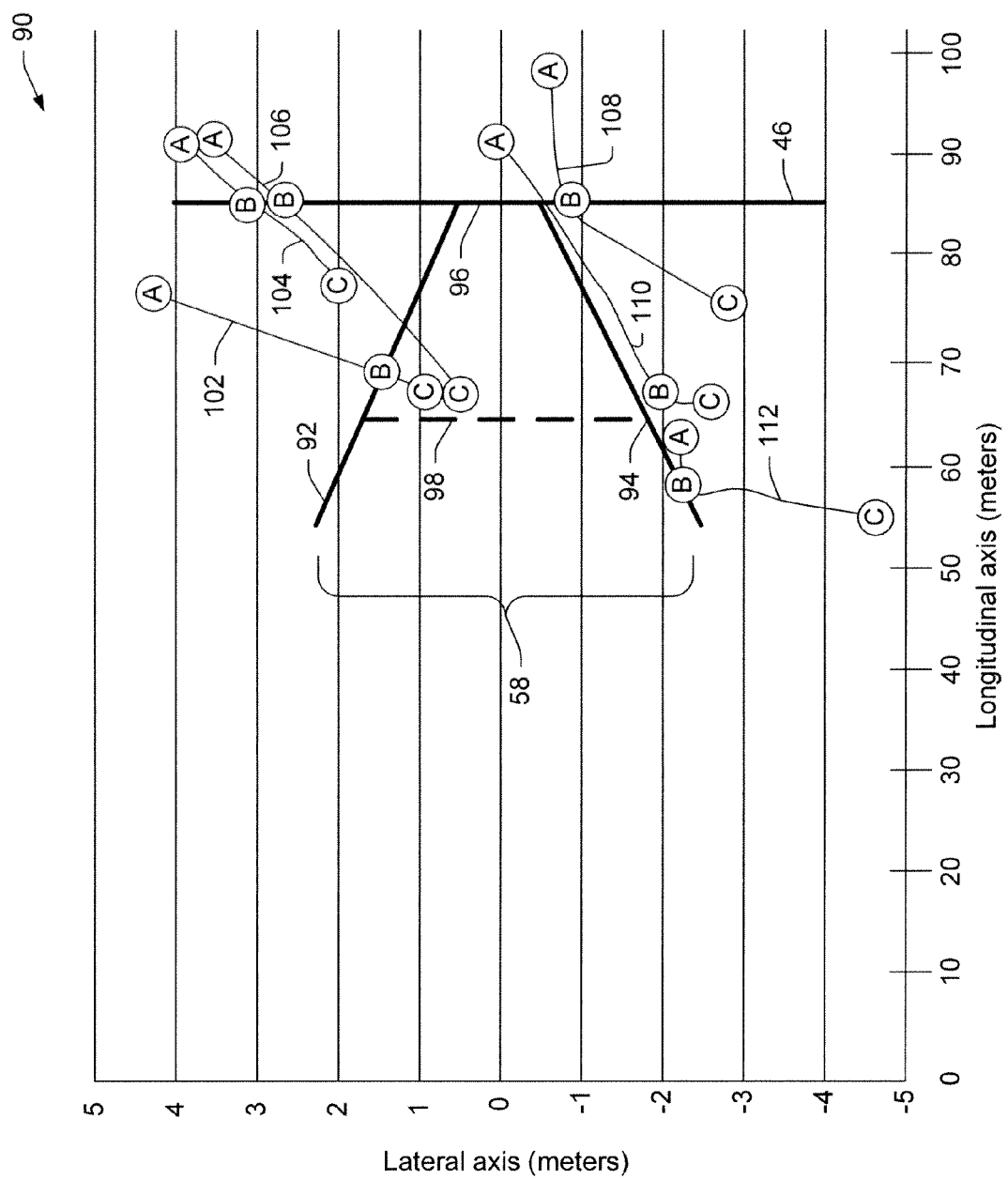
FIG. 2 illustrates a graph showing data for a plurality of forward vehicles being tracked by an ACB system, such as the system of FIG. 1, installed in a host vehicle.
Figure 3:
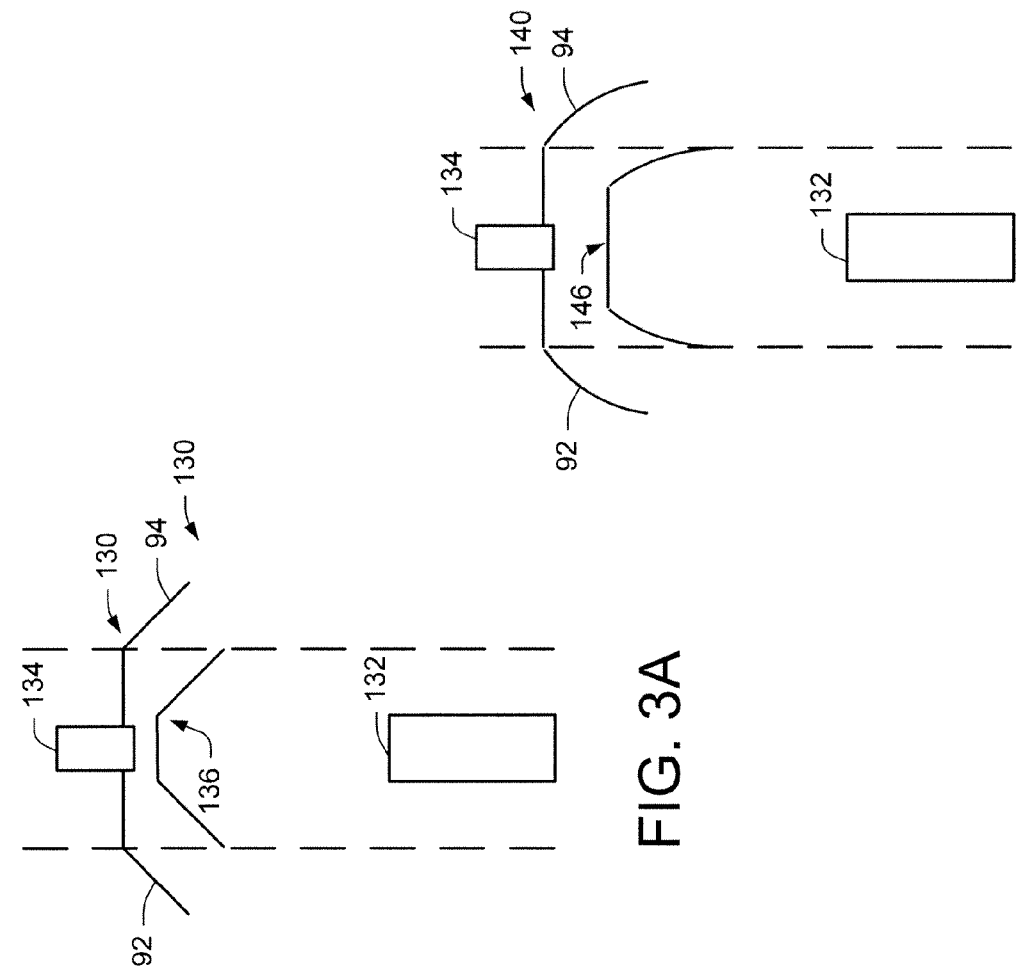
FIG. 3A illustrates a FDLS with linear longitudinal portions positioned ahead of a host vehicle and being breached by a forward vehicle.
FIG. 3B illustrates a FDLS with parabolic longitudinal portions positioned ahead of a host vehicle and being breached by a forward vehicle.
FIG. 3C illustrates a FDLS with linear longitudinal portions positioned ahead of a host vehicle and being breached by a forward vehicle.

FIG. 2 illustrates a graph 90 showing data for a plurality of forward vehicles being tracked by an ACB system, such as the system 10 of FIG. 1, installed in a host vehicle. The sensors on the host vehicle are taken to be positioned at 0 m on the lateral axis, and 0 m on the longitudinal axis. An FDLS 58 is represented on the graph, and comprises first and second longitudinal portions 92, 94, and a lateral portion 96 that coincides with a preset BRD 96 (e.g., 85 meters in this example). Additionally, the FDLS includes a reduced BRD 98 that may be implemented, for instance, when the host vehicle is determined to be on a curved road with a radius of curvature exceeding a predefined limit, as described with regard to various features herein. The graph illustrates data representative of 6 forward vehicles, the trajectories of each forward vehicle being labeled 102, 104, 106, 108, 110, and 112, respectively. Each of the forward vehicle's trajectories is further labeled to identify a first point, A, at which the respective forward vehicle was first detected by the ACB system; a second point, B, at which the respective forward vehicle breached the FDLS 58 and triggered a braking reaction in the host vehicle; and a third point, C, at which the respective forward vehicle was released (e.g., was no longer tracked).

According to an example, lateral offset function 56 (FIG. 1) defines the left (relative to the direction of travel of the host vehicle) longitudinal portion 92 of the FDLS 58 as a line described by the equation $y=-0.058x+5.43$, and the right longitudinal portion 94 as a line described by the equation $y=0.058x-5.43$. The longitudinal portions extend from a distance of approximately 55 m in front of the host vehicle along their respective slopes until they terminate at the BRD 48 (e.g., 85 m in front of the host vehicle). In one embodiment, outside of the FDLS 58, braking response is limited to engine retarder and dethrottle activation only. It will be appreciated that the specific values of the slopes and intersects of the lines defining the longitudinal portions 92, 94 of the FDLS described herein are illustrative in nature and not to be construed in a limiting sense. Rather, the FDLS may have any desired shape or contours.

The following pseudocode example is provided by way of example as illustrative of a lateral offset function that defines a FDLS:

```
if (x > 85 meters)
        limit XBR to −1.17m/s/s
OR
(((x > 55 meters) AND (x <= 85 meters)) AND (y > 0.058x + 5.43)
    OR (y < −0.058x − 5.43)))
        limit XBR to −1.17m/s/s
else (no limit to XBR)
``` where x is the longitudinal position of the forward vehicle relative to the host vehicle, y is the lateral position of the forward vehicle relative to the host vehicle (i.e., relative to a longitudinal axis extending through and forward from the host vehicle), and XBR represents a deceleration request from the controller to the deceleration system. It will be appreciated that the specific limits, values, and coefficients set forth in the foregoing example (e.g., −1.17 m/s/s, 55 meters, 85 meters, 0.058, 5.43, etc.) are provided for illustrative purposes only, and are not intended to limit the scope of the innovation set forth herein.

FIG. 3A illustrates a FDLS 130 with linear longitudinal portions 92, 94, positioned ahead of a host vehicle 132 and being breached by a forward vehicle 134. The longitudinal portions are symmetrical, in order to detect a forward vehicle that may be changing lanes into the host vehicle's lane from either side. In another embodiment, an intra-lane FDLS 136 is maintained within a lane in which the host vehicle 132 is traveling. That is, the linear longitudinal portions of the FDLS 136 extend from the respective ends of the BRD, toward the host vehicle 132, and terminate at the edges of the lane.

FIG. 3B illustrates a FDLS 140 with parabolic longitudinal portions 92, 94, positioned ahead of a host vehicle 132 and being breached by a forward vehicle 134. The longitudinal portions are again symmetrical, in order to detect a forward vehicle that may be changing lanes into the host vehicle's lane from either side. In another embodiment, an intra-lane FDLS 146 is maintained within a lane in which the host vehicle 132 is traveling. That is, the parabolic longitudinal portions of the FDLS 146 extend from the respective ends of the BRD, toward the host vehicle 132, and terminate at the edges of the lane.

FIG. 3C illustrates a FDLS 150 with linear longitudinal portions 92, 94, positioned ahead of a host vehicle 132 and being breached by a forward vehicle 134. The longitudinal portions are asymmetrical, and the FDLS 150 formed thereby may be employed, for instance, when the host vehicle is traveling in a right-most lane of a highway or the like, in order to detect a forward vehicle that may be changing lanes into the host vehicle's lane from a center or left lane. Should the host vehicle move into a center lane, the FDLS can be switched back to a symmetrical configuration, such as is shown in FIGS. 3A and 3B. Additionally, the asymmetry of the FDLS 150 may be reversed for left lane travel. It will be appreciated that the shape and symmetry/asymmetry of the FDLS is not limited to those shown in FIGS. 3A-3C, but rather the FDLS may have any desired shape and/or asymmetry.

In another embodiment, an intra-lane FDLS 156 is maintained within a lane in which the host vehicle 132 is traveling. That is, the linear longitudinal portions of the FDLS 156 extend from the respective ends of the BRD, toward the host vehicle 132, and terminate at the edges of the lane.

Figure 4:
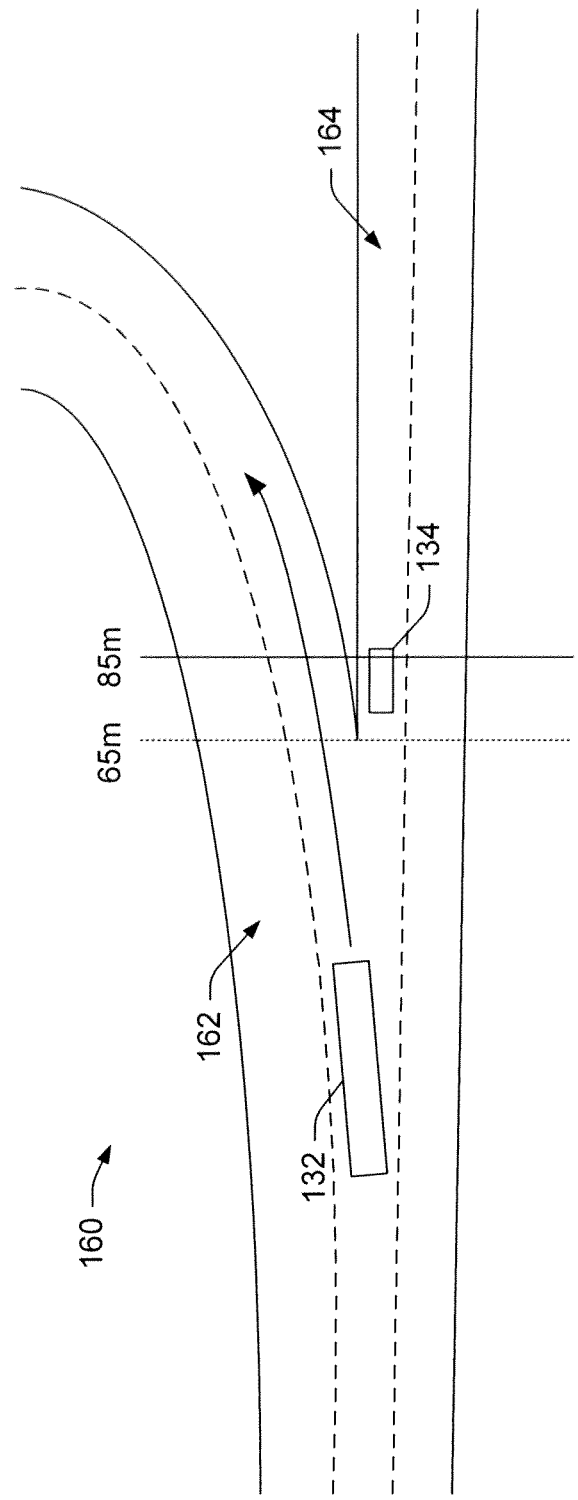
FIG. 4 illustrates a highway interchange on which the host vehicle and forward vehicle are travelling, comprising a highway and an exit ramp.

FIG. 4 illustrates a highway interchange 160 on which the host vehicle 132 and forward vehicle 134 are traveling, comprising a highway 162 and an exit ramp 164. The forward vehicle has breached the initial BRD at 85 meters in front of the host vehicle. However, the curvature of the road has been detected (e.g., as described with regard to FIG. 1, using yaw, lateral acceleration, steering information, etc.) and the host vehicle has been determined to be following the curvature, as indicated by the arrow extending forward from the host vehicle along the highway 162. The radius of curvature of the road has been determined to be above the predetermined threshold, and therefore the processor in the controller has reduced the BRD to 65 meters, since the forward vehicle is heading straight down the exit ramp 164 and is not "in front" of the host vehicle on the highway.

Figure 5:
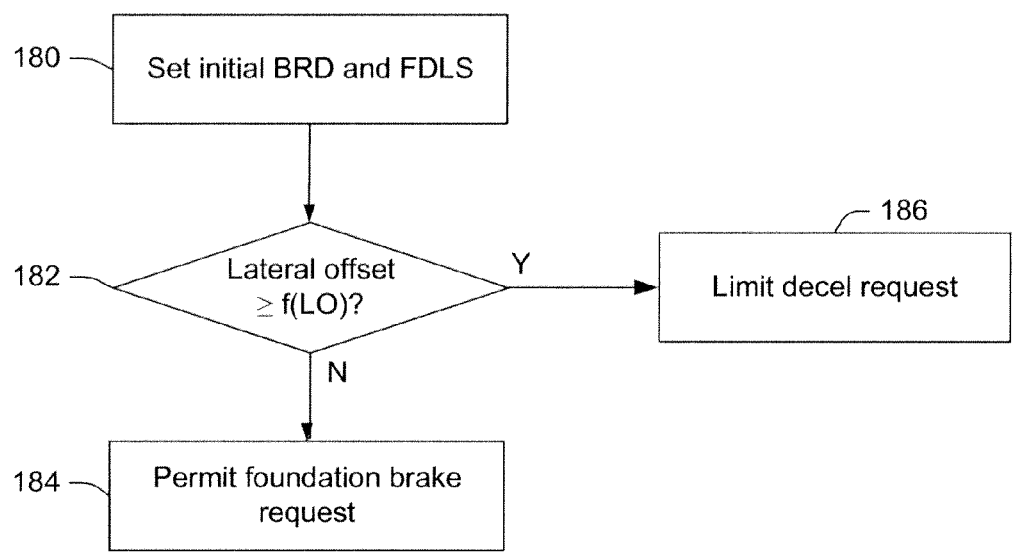
FIG. 5 illustrates a method of detecting a lateral offset for a forward vehicle relative to a host vehicle and permitting a braking reaction if the lateral offset of the forward vehicle is less than a predetermined value and a deceleration request is made.

FIG. 5 illustrates a method of detecting a lateral offset for a forward vehicle relative to a host vehicle and initiating a braking reaction if the lateral offset of the forward vehicle is less than a predetermined value. At 180, an initial braking reaction distance and following distance limit shape are set. For instance, a default BRD may be set at 85 meters, and a partial trapezoidal FDLS selected such as is described with regard to FIGS. 2 and 3A-3C. At 182, a determination is made regarding whether a forward vehicle has been detected with a lateral offset having a value that is greater than or equal to a value (y) described by a lateral offset function f(LO), such as the lateral offset function 56 of FIG. 1. If the value of the lateral offset is not greater than or equal to the value (y), then the forward vehicle has breached the FDLS and, at 184, limits on deceleration requests from the controller to the deceleration system are removed such that the controller is permitted to request foundation brakes in addition to engine retardation and dethrottling. If the determination at 182 indicates that the value of the lateral offset of the forward vehicle is greater than a value described by the lateral offset function, then the forward vehicle has not breached the FDLS, and deceleration requests are limited to the engine retarder and the dethrottling module of the host vehicle (e.g., the ECU does not send a deceleration request to the foundation brakes), at 186.

Figure 6:
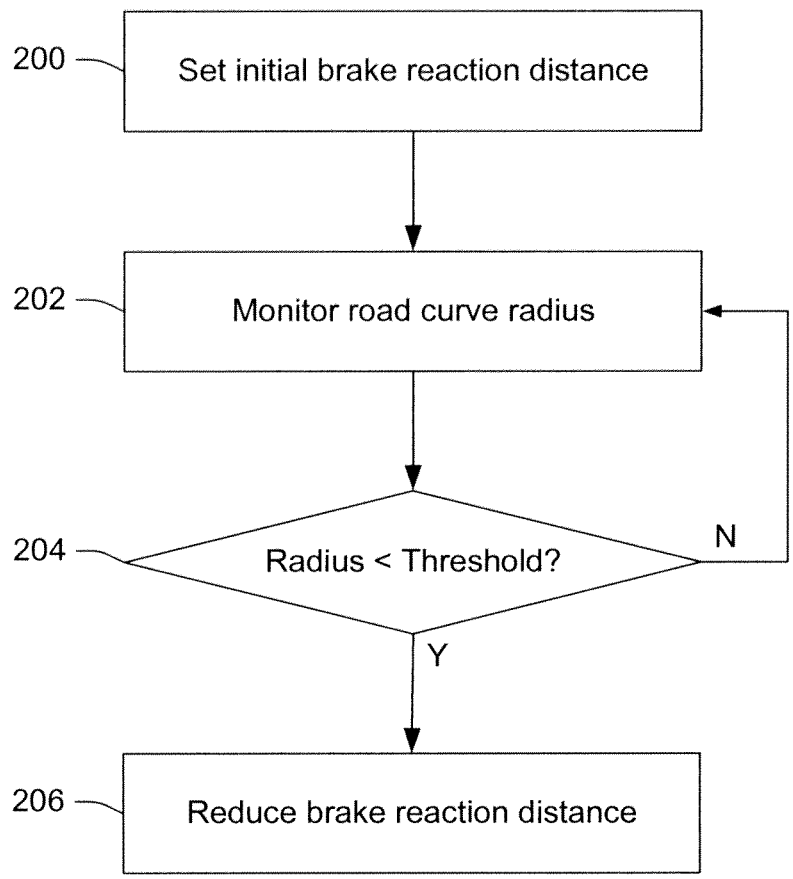
FIG. 6 illustrates a method of reducing a braking reaction distance as a function of a radius of curvature of the road on which the host vehicle is travelling.

FIG. 6 illustrates a method of reducing a braking reaction distance as a function of a radius of curvature of the road on which the host vehicle is traveling. At 200, an initial BRD is set (e.g., 90 meters, 3 seconds, or some other pre-selected distance or interval), which, when breached, triggers a deceleration request to be sent from the controller to a deceleration system in the host vehicle. At 202, road curvature is monitored. Monitoring of the road curvature may be performed as described with regard to FIG. 1, using yaw, steering, and lateral acceleration of the host vehicle, as well as radar and camera sensor information. At 204, a determination is made regarding whether the radius of curvature of the road is less than a predefined threshold radius of curvature. The predefined threshold value may be a static value or a dynamic value that changes as a function of the speed of the host vehicle. If the radius of curvature is not less than the threshold, then the BRD is maintained and the method reverts to 202 for continued road curvature monitoring.

If, at 204, it is determined that the radius of curvature of the road is less than the threshold value, then at 206, the BRD is reduced (e.g., to 60 meters, 2 seconds or some other pre-selected distance or interval). By reducing the BRD for the host vehicle when the host vehicle is in a turn or on a curve on a highway, a forward vehicle that has breached the initial BRD and is perceived as being in front of the host vehicle will not trigger a braking reaction. That is, since the processor is aware that the host vehicle is on a curve, a forward vehicle that is perceived to be traveling a straight line directly in front of the host vehicle may be assumed not to be following the curve (e.g., such as when the forward vehicle is on an exit ramp, which supports the decision to reduce the BRD so that the exiting forward vehicle will not trigger an unnecessary braking reaction.

Figure 7:
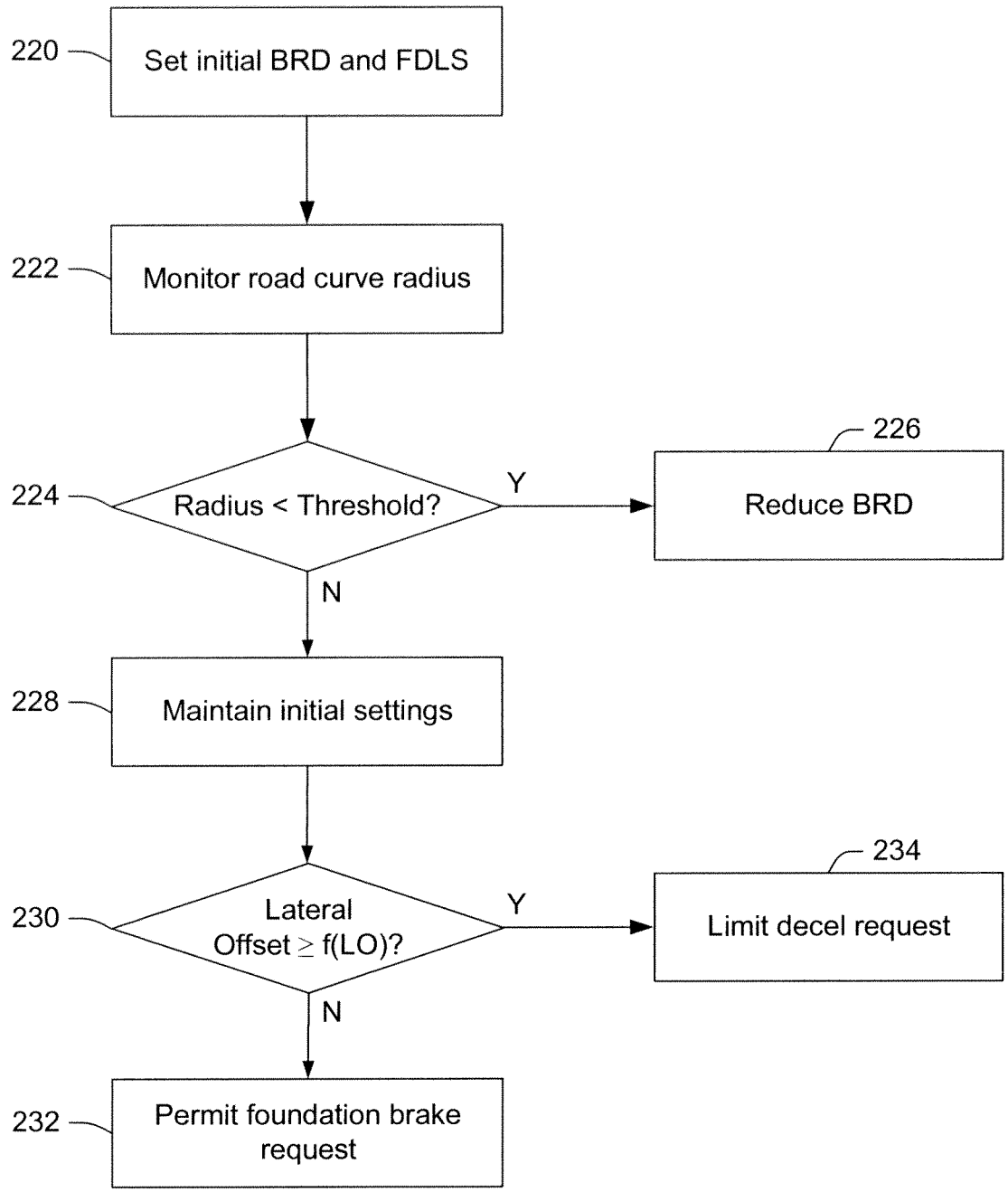
FIG. 7 illustrates a method of reducing a braking reaction distance as a function of a radius of curvature of the road on which the host vehicle is travelling and detecting a lateral offset for a forward vehicle relative to a host vehicle and permitting a braking reaction if the lateral offset of the forward vehicle is less than a predetermined value and a deceleration request is made.

FIG. 7 illustrates a method of reducing a braking reaction distance as a function of a radius of curvature of the road on which the host vehicle is traveling and detecting a lateral offset for a forward vehicle relative to a host vehicle and initiating a braking reaction if the lateral offset of the forward vehicle is less than or equal to a predetermined value. At 220, an initial BRD is set (e.g., 80 meters, 3 seconds, or some other pre-selected distance or interval), which, when breached, triggers a deceleration request to be sent from a controller to a deceleration system in the host vehicle. Additionally, a FDLS is set or selected, such as a partial trapezoidal FDLS as is described with regard to FIGS. 2 and 3A-3C. At 222, road curvature is monitored. Monitoring of the road curvature may be performed as described with regard to FIG. 1, using yaw, steering, and lateral acceleration of the host vehicle, as well as radar and camera sensor information. At 224, a determination is made regarding whether the radius of curvature of the road is less than a predefined threshold radius of curvature, which may be a static value or a dynamic value that changes as a function of the speed of the host vehicle. If it is determined that the radius of curvature of the road is less than the threshold value, then at 226, the BRD is reduced (e.g., to 60 meters, 2.25 seconds or some other pre-selected distance or interval).

If the radius of curvature is not less than the threshold, then the initial BRD and FDLS settings are maintained and curvature monitoring is continued, at 228. At 230, a determination is made regarding whether a forward vehicle has been detected to have a lateral offset having a value that is greater than or equal to a value (y) described by a lateral offset function f(LO), such as the lateral offset function 56 of FIG. 1. If the value of the lateral offset is not greater than or equal to the value (y), then the forward vehicle has breached the FDLS and, at 232, limits on deceleration requests from the controller to the deceleration system are removed (i.e., the controller is permitted to request foundation brakes, in addition to engine retardation and dethrottling). If the determination at 230 indicates that the value of the lateral offset of the forward vehicle is greater than or equal to the value described by the lateral offset function, then the forward vehicle has not breached the FDLS, and deceleration requests are limited to the engine retarder and the dethrottling module of the host vehicle (e.g., the controller does not send a deceleration request to the foundation brakes), at 234.

Figure 8:
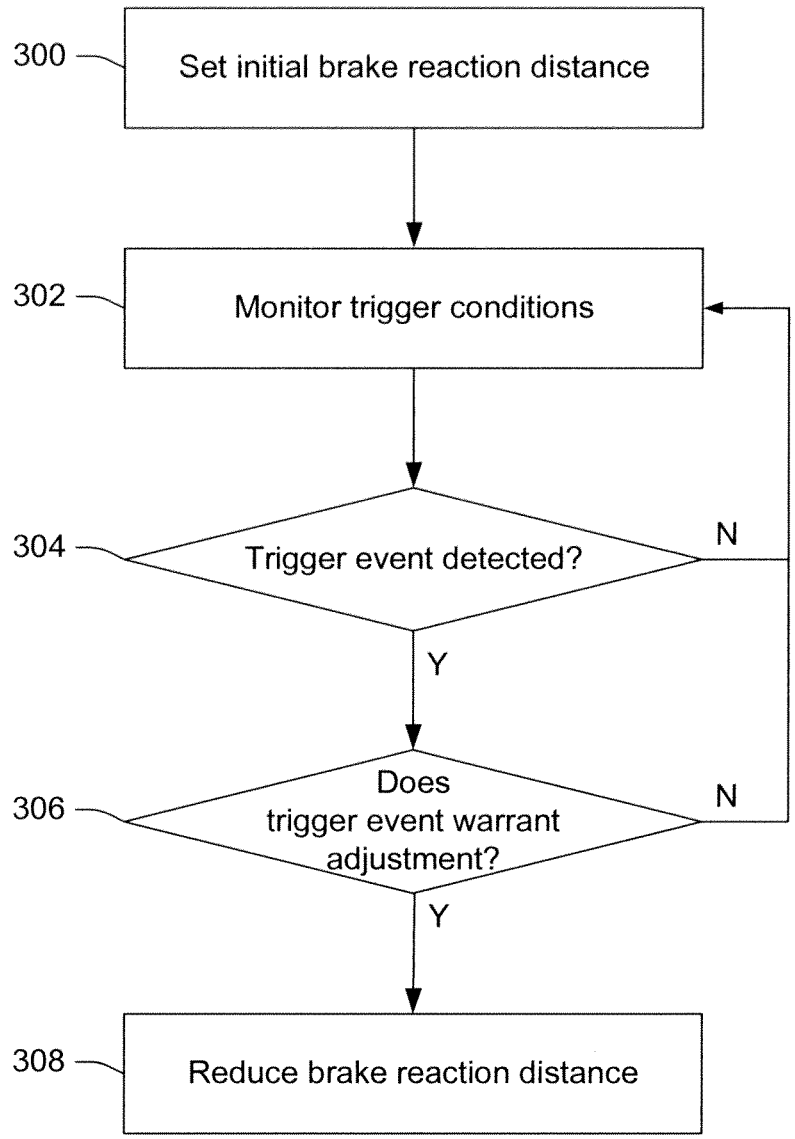
FIG. 8 illustrates a method of reducing a braking reaction distance in response to a detected trigger event while leaving a preset following distance unchanged.

FIG. 8 illustrates a method of reducing a braking reaction distance in response to a detected trigger event while leaving a preset following distance unchanged. Trigger events may include, without limitation, system fault conditions, ABS/traction/stability events, road surface conditions (based on wheel slip, frequency of ABS/traction/stability events, and/or input from the camera), input from a tire pressure monitoring system, traffic conditions such as congestion/density, current and/or recent velocities of vehicles in the same or neighboring lanes, current and/or recent relative velocities of vehicles in the same or neighboring lanes (relative to the host vehicle and/or relative to each other), current and/or recent accelerations of vehicles in the same or neighboring lanes, current and/or recent relative accelerations of vehicles in the same or neighboring lanes (relative to the host vehicle and/or relative to each other), road terrain (e.g., flat straight roads, curvy mountain roads, etc. In one example. GPS is employed to determine the local terrain (straight flat road, mountainous curved roads, etc.) of the road on which the host vehicle is traveling, and the BRD and/or FDLS is adjusted accordingly.

At 300, an initial BRD is set (e.g., 90 meters, 3 seconds, or some other pre-selected distance or interval), which, when breached, permits an unlimited deceleration request to be sent from the controller to a deceleration system in the host vehicle (i.e., restrictions on the deceleration request are removed to permit foundation brakes to be activated). At 302, one or more trigger conditions are monitored. Monitoring of the trigger conditions (e.g., environmental parameters or the like) may be performed as described with regard to FIGS. 1 and 13, using radar and camera sensor information, GPS information, and the like. At 304, a determination is made regarding whether a trigger event has been detected. A trigger event occurs when one or more of the monitored trigger conditions is detected or determined to be above (or below) a respective predetermined threshold level. The predetermined threshold value may be a static value or a dynamic value that changes as a function of the speed of the host vehicle, time of day (or night) or as a function of some other predetermined variable or factor. If no trigger event is detected at 304, then the BRD is maintained and the method reverts to 302 for continued trigger event monitoring.

If, at 304, it is determined that a trigger event has occurred, then at 306, a determination is made regarding whether the trigger event warrants a BRD adjustment. If not, then the method reverts to 302 for continued monitoring of trigger conditions. If the detected trigger event warrants a BRD reduction, then at 308 the BRD is reduced (e.g., to 60 meters, 2 seconds or some other pre-selected distance or interval).

Figure 9:
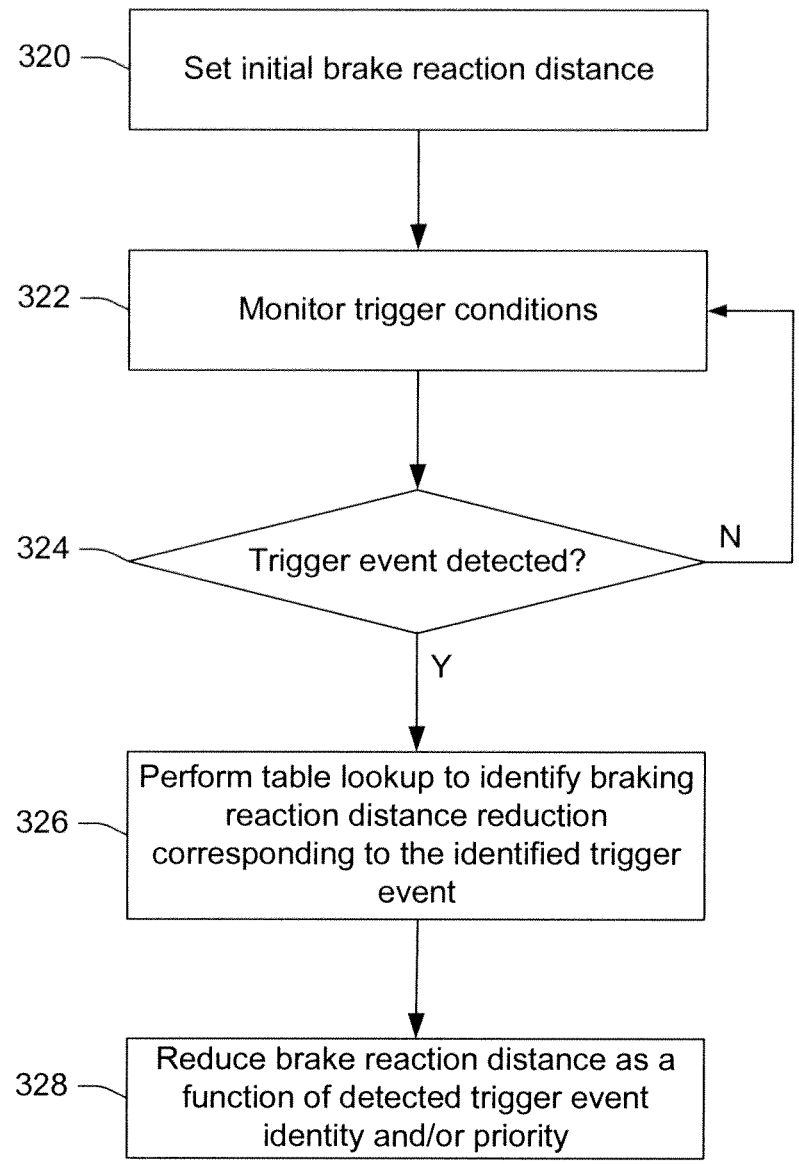
FIG. 9 illustrates a method of reducing a braking reaction distance in response to a detected trigger event.

FIG. 9 illustrates a method of reducing a braking reaction distance in response to a detected trigger event. At 320, an initial BRD is set (e.g., 90 meters, 3 seconds, or some other pre-selected distance or interval), which, when breached, causes a deceleration request to be sent from the controller to a deceleration system in the host vehicle. At 322, one or more trigger conditions are monitored. Monitoring of the trigger conditions may be performed as described with regard to FIG. 13, using radar and camera sensor information, GPS information, and the like. At 324, a determination is made regarding whether a trigger event has been detected. A trigger event occurs when one or more of the monitored trigger conditions is detected or determined to be above (or below) a respective predetermined threshold level. The predetermined threshold value may be a static value or a dynamic value that changes as a function of the speed of the host vehicle, time of day (or night) or as a function of some other predetermined variable or factor. If no trigger event is detected at 324, then the BRD is maintained and the method reverts to 322 for continued trigger event monitoring.

If, at 324, it is determined that a trigger event has occurred, then at 326, a BRD reduction corresponding to the detected trigger event is identified (e.g., via a table-lookup or the like). At 328, the BRD is reduced by the amount indicated in the lookup table (e.g., to 60 meters, 2 seconds or some other pre-selected distance or interval, according to one example).

Figure 10:
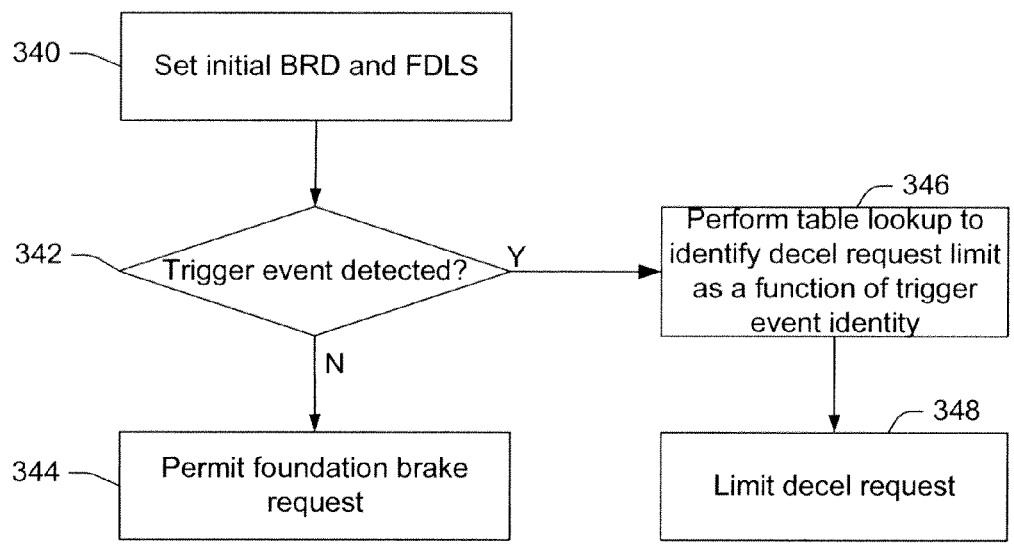
FIG. 10 illustrates a method of detecting a lateral offset for a forward vehicle relative to a host vehicle and initiating a braking reaction if the lateral offset of the forward vehicle is less than a predetermined value.

FIG. 10 illustrates a method of detecting a lateral offset for a forward vehicle relative to a host vehicle and initiating a braking reaction if the lateral offset of the forward vehicle is less than a predetermined value. At 340, an initial braking reaction distance and following distance limit shape are set. For instance, a default BRD may be set at 85 meters, and a partial trapezoidal FDLS selected such as is described with regard to FIGS. 2 and 3A-3C. At 342, a determination is made regarding whether a trigger event has been detected. If no trigger event is detected, then at 344, limits on deceleration requests from the controller to the deceleration system are removed such that the controller is permitted to request foundation brakes in addition to engine retardation and dethrottling. If the determination at 342 indicates that a trigger event has been detected, then a table lookup is performed at 346 to identify a deceleration request limit that corresponds to the detected trigger event. At 348, deceleration requests are limited to the engine retarder and the dethrottling module of the host vehicle (e.g., the ECU does not send a deceleration request to the foundation brakes).

Figure 11:
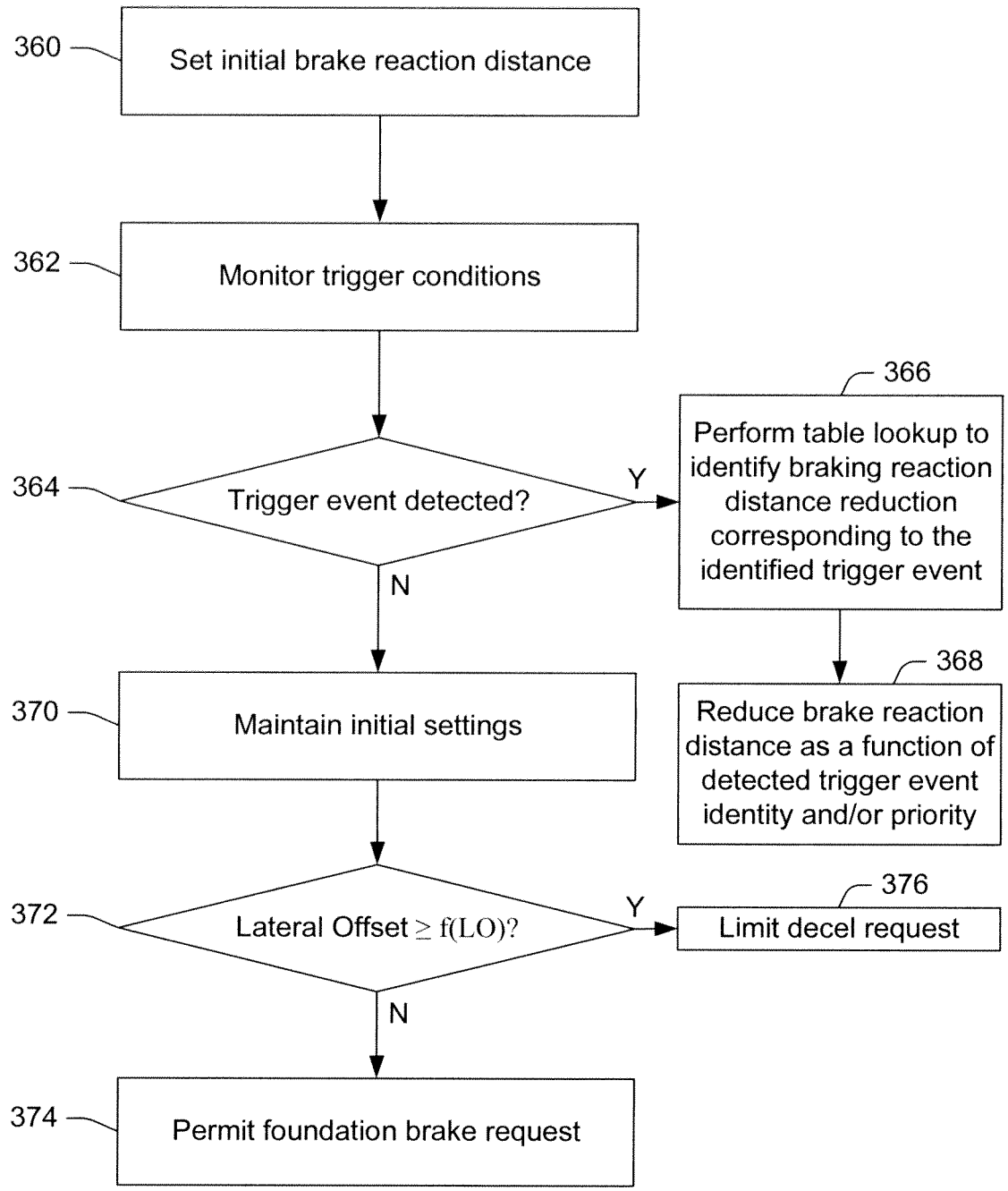
FIG. 11 illustrates a method of reducing a braking reaction distance in response to a detected trigger event.

FIG. 11 illustrates a method of reducing a braking reaction distance in response to a detected trigger event. At 360, an initial BRD is set (e.g., 90 meters, 3 seconds, or some other pre-selected distance or interval), which, when breached, causes a deceleration request to be sent from the controller to a deceleration system in the host vehicle. At 362, one or more trigger conditions are monitored. Monitoring of the trigger conditions may be performed as described with regard to FIG. 13, using radar and camera sensor information, GPS information, and the like. At 364, a determination is made regarding whether a trigger event has been detected. A trigger event occurs when one or more of the monitored trigger conditions is detected or determined to be above (or below) a respective predetermined threshold level. The predetermined threshold value may be a static value or a dynamic value that changes as a function of the speed of the host vehicle, time of day (or night) or as a function of some other predetermined variable or factor. If, at 364, it is determined that a trigger event has occurred, then at 366, a BRD reduction corresponding to the detected trigger event is identified (e.g., via a table-lookup or the like). At 368, the BRD is reduced by the amount indicated in the lookup table (e.g., to 60 meters, 2 seconds or some other pre-selected distance or interval, according to one example).

If no trigger event is detected at 364, then the initial BRD is maintained at 370. At 372, a determination is made regarding whether a forward vehicle has been detected to have a lateral offset having a value that is greater than or equal to a value (y) described by a lateral offset function f(LO), such as the lateral offset function 456 of FIG. 13. If the value of the lateral offset is not greater than or equal to the value (y), then the forward vehicle has breached the FDLS and, at 374, limits on deceleration requests from the controller to the deceleration system are removed (i.e., the controller is permitted to request foundation brakes, in addition to engine retardation and dethrottling). If the determination at 372 indicates that the value of the lateral offset of the forward vehicle is greater than or equal to the value described by the lateral offset function, then the forward vehicle has not breached the FDLS, and deceleration requests are limited to the engine retarder and the dethrottling module of the host vehicle (e.g., the controller does not send a deceleration request to the foundation brakes), at 376.

Figure 13:
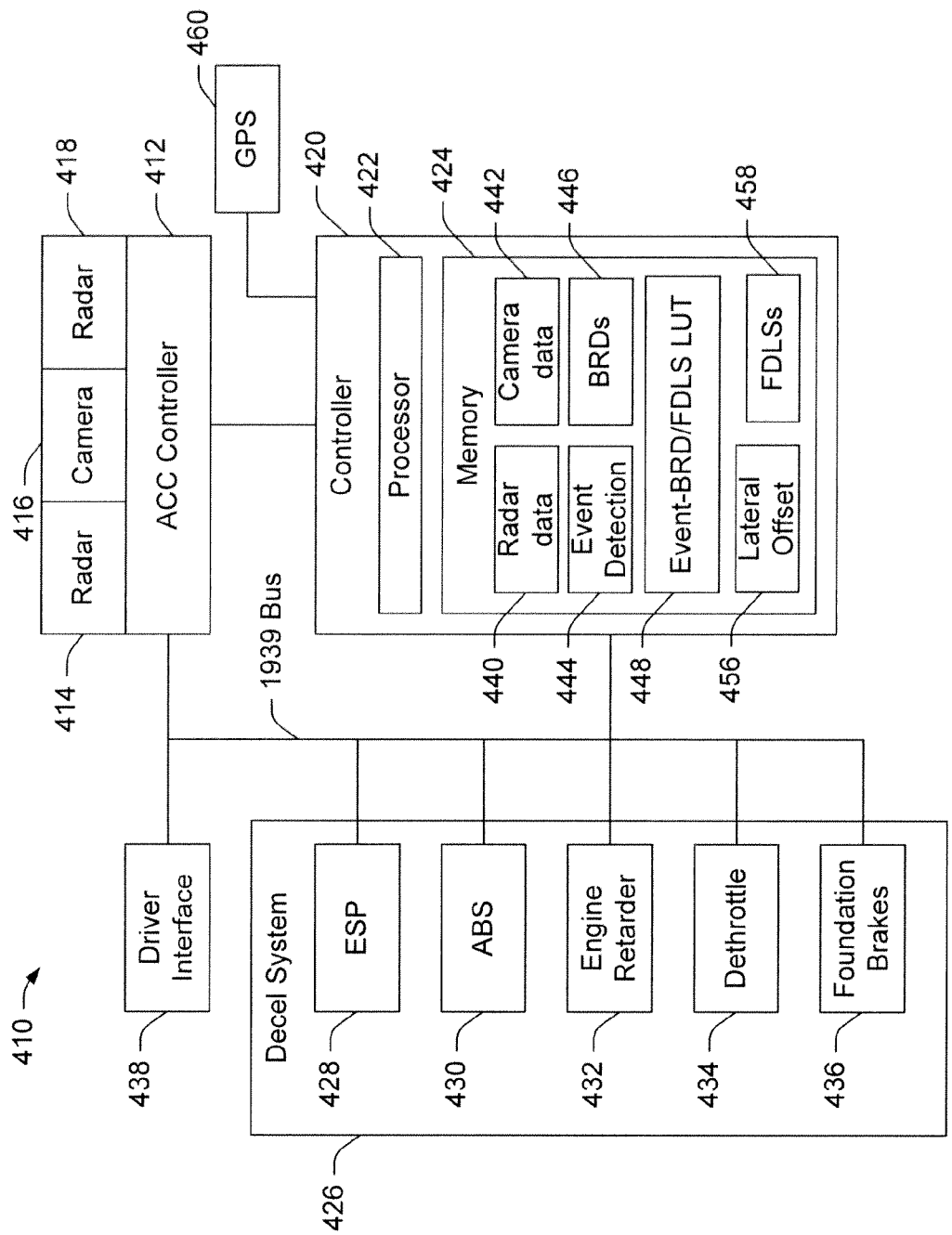
FIG. 13 illustrates a system for reducing a braking reaction distance in response to a detected trigger event, and without adjusting following distance.

It will be appreciated that the methods of FIGS. 8-11 may be executed by a computer or processor, such as the processor 422 of FIG. 13, and stored on a computer-readable medium (i.e., as a set of computer-executable instructions, algorithms, processes, applications, routines, etc.), such as the memory 424 of FIG. 13.

Figure 12:
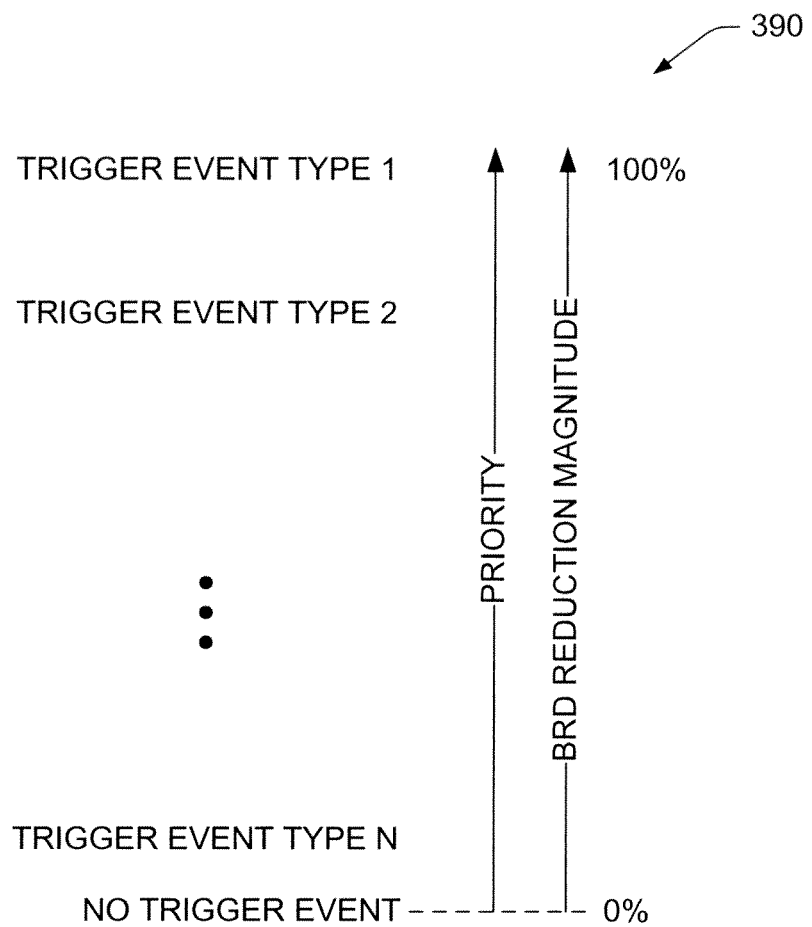
FIG. 12 illustrates a correspondence between trigger event type priority or weight and BRD reduction magnitude, in accordance with one or more aspects described herein.

FIG. 12 illustrates a correspondence 390 between trigger event type priority or weight and BRD reduction magnitude, in accordance with one or more aspects described herein. For example, a first trigger event (e.g., rain or wet road conditions, as detected by a camera sensor, a radar sensor, an onboard computer with Internet connectivity, or the like) type may be assigned a highest priority or weight. A second event type (e.g., traffic density above a predetermined acceptable threshold level) may be assigned a second priority or weight. Any number N of trigger event types can be employed by the described systems and methods, and more than one trigger event can be assigned a common priority or weight. The magnitude of the BRD reduction is related (e.g., linearly, exponentially, etc.) to the priority or weight of the detected trigger event.

FIG. 13 illustrates a system for reducing a braking reaction distance in response to a detected trigger event, and without adjusting following distance. The system facilitates adjusting an extant range limit for foundation braking by an ACC system based on any one or combination of multiple possible internal or external factors (trigger events or conditions). The BRD and/or the FDLS is adjusted in response to detected trigger events or conditions, including but not limited to system fault conditions (e.g., a detected system failure in the host vehicle, wherein the system failure may affect vehicle control or safety), ABS/traction/stability events, road surface conditions (based on wheel slip, frequency of ABS/traction/stability events, and/or input from the camera), input from a tire pressure monitoring system, traffic conditions such as congestion/density, current and/or recent velocities of vehicles in the same or neighboring lanes, current and/or recent relative velocities of vehicles in the same or neighboring lanes lanes (relative to the host vehicle and/or relative to each other), current and/or recent accelerations of vehicles in the same or neighboring lanes, current and/or recent relative accelerations of vehicles in the same or neighboring lanes (relative to the host vehicle and/or relative to each other), road topography or terrain (e.g., flat straight roads, curvy mountain roads, etc.) etc. In one example, GPS is employed to determine the local terrain (straight flat road, mountainous curved roads, etc.) of the road on which the host vehicle is traveling, and the BRD and/or FDLS is adjusted accordingly.

The system 410 includes an adaptive cruise control (ACC) module 412 that is coupled to a radar sensor 414 that detects objects on the road in front of the host vehicle to which it is mounted. The radar sensor 414 emits a radar signal that is reflected off of forward objects back to the radar sensor. Based on various characteristics of the reflected signal, the radar sensor identifies the forward object as a forward vehicle that warrants tracking or a non-vehicle object (e.g., a road sign, an aluminum can on the shoulder, etc.) that may be dismissed. The ACC module 412 may also be coupled to a camera sensor 416 that detects forward objects, and optionally to a second radar sensor 418 that operates in the same manner as the radar sensor 414. The camera sensor captures an image of a forward object and compares various properties of the image (e.g., pixel and contrast information, etc.) to stored images to determine whether the forward object is a vehicle that warrants tracking or a non-vehicle object that may be dismissed.

The ACC module 412 is communicatively coupled to a controller 420 that comprises a processor 422 that executes, and a memory 424 that stores, computer-executable instructions, algorithms, routines, applications, processes, programs, etc., for performing the various functions and methods described herein. The ACC 412 and controller 420 are further communicatively coupled to a deceleration system 426 that comprises a electronic stability program (ESP) module 428, an antilock brake system (ABS) module 430, an engine retarder 432, an engine dethrottling program or module 434, and foundation brakes 436. The brake system 426, ACC 412, and controller 420 are also communicatively coupled to a driver interface 438 (e.g., a graphical user interface or the like), via which alerts and/or instructions related to forward vehicle status, host vehicle braking, etc., are provided to a driver. In one embodiment, an alert is provided to the driver via the interface 438 each time the BRD and/or the FDLS is adjusted.

The memory stores radar data 440 related to detected forward vehicles and received from the radar sensors, and/or camera data 442 related to detected forward vehicles and received from the camera sensor. The memory stores, and the processor executes, an event detection algorithm 444 (e.g., computer-executable instructions) for monitoring one or more trigger conditions or parameters (e.g., road conditions, weather, traffic density, etc.) and comparing the monitored or measured conditions to corresponding) threshold values to determine whether a trigger event has occurred. If the processor 422 determines that a trigger event has occurred (e.g., it is raining, the host vehicle is in heavy traffic, etc.), then a braking reaction distance (BRD) limit 446 is adjusted to account trigger event. The BRD 446 is a distance limit (e.g.: a static distance, such as 85 meters; a temporal distance, such as 2.5 seconds; etc.) that, when breached by a forward vehicle, permits the controller 420 to request a braking reaction, in addition to one or more of engine retardation and dethrottling. The BRD may be viewed as a maximum distance at which the foundation brakes are allowed to be implemented (e.g., at which a deceleration request is permitted to be sent to the foundation brakes). Beyond this distance, other forms of deceleration may be optionally permitted, such as engine retardation and dethrottling.

Trigger events may be detected or determined as a function of radar data 440 and/or camera data 442, and/or as a function of data received by an onboard computer or the like having wireless Internet connectivity. Additionally, the memory 424 stores, and the processor 422 executes, a yaw detection an event-BRD lookup table 448 that correlates trigger events to BRD reductions and/or FDLS adjustments.

The braking reaction may increase in severity or magnitude as a function of the speed with which the host vehicle is overtaking or approaching the forward vehicle. For instance, if a forward vehicle has just breached the BRD but slowly, then the controller 420 sends a deceleration command to the dethrottling module 434 to reduce host vehicle speed. If the forward vehicle is decelerating quickly, as determined from the radar and/or camera data, then the controller 420 sends a deceleration command to the engine retarder 422 to further reduce host vehicle speed. If the forward vehicle has fully applied its brakes and is decelerating rapidly, then the controller 420 sends a deceleration command to the foundation brakes 426 to initiate rapid deceleration of the host vehicle. The magnitude of the deceleration request or command sent to any of the dethrottling module, the engine retarder, and/or the foundation brakes is variable as a function of the deceleration of the forward vehicle.

In another embodiment, the memory 424 stores a lateral offset function 456 that defines a following distance limit shape (FDLS) 458 (see, e.g., FIGS. 2 and 3) that accounts for forward vehicles breaching the BRD from a lateral direction (e.g., changing lanes and entering the host vehicle's lane at a distance less than the BRD, etc.). The shape or size of the following distance limit shape is variable as a function of host vehicle speed. For instance, the braking range limit can be modified when the lateral offset of the forward vehicle is greater than the predefined lateral offset function 456. In one embodiment, the lateral offset function 456 establishes a cone shaped FDLS, such that if the target vehicle is outside the "cone" and the longitudinal distance is between, e.g., 55 m and 85 m, the deceleration limit requirement remains unchanged, as if the forward vehicle were farther than 85 m. These features minimize false braking interventions. It will be understood that when a forward vehicle is outside the FDLS 458 defined by the lateral offset function 456, dethrottle and engine retarder requests may be made. If the forward vehicle breaches or enters the FLDS 458, then foundation brake requests are also permitted, in addition to requests for dethrottling and engine retardation.

In accordance with various features described herein, if there is an active deceleration request but the forward vehicle is outside the FDLS 458, then the controller is not permitted to request braking but may still request dethrottling and retarder deceleration. If there is no active deceleration request, but the forward vehicle is inside the FDLS 458, then braking may be requested by the controller, in addition to dethrottle and engine retardation, if and when a deceleration request is made.

In other embodiments, the width of the FDLS (i.e., the slope or lateral span of the longitudinal portions) is adjusted as a function of traffic density, host vehicle speed, etc. For instance, in regions with high traffic density, such as metropolitan areas through which a highway passes, the width of the FDLS may be decreased, so to reduce breaking reactions. At high speeds, the width of the FDLS may be increased to provide increased reaction time for the driver. The adjustment to the FDLS is performed by the processor according to a prescribed FDLS adjustment identified by accessing the LUT 448 and is a function of the detected trigger event.

Additionally, the system 410 includes a GPS module 460 that provides information to the processor for determining a type of road on which the host vehicle is traveling. For instance, a BRD reduction and/or an FDLS shape adjustment can be triggered when the host vehicle is traveling through mountainous terrain, as opposed to when the host vehicle is traveling on a straight, relatively flat road. In one embodiment, the GPS module 460 accesses real-time weather information for the locale in which it is positioned, which may be used to identify a trigger event (e.g., rain or sleet that affects road conditions, visibility, etc.). In another embodiment, GPS location information is cross-referenced to a database (not shown) comprising the coordinates of geographic locations where there is a high incidence of false brake reactions. For instance, a particular interchange in a particular city may regularly trigger braking reactions in vehicles due to an odd incline and/or curvature of an interchange ramp. In this case, such coordinates can be tagged or otherwise marked as being candidates for triggering brake reaction adjustments in order to mitigate unnecessary brake reactions.

Figure 14B:
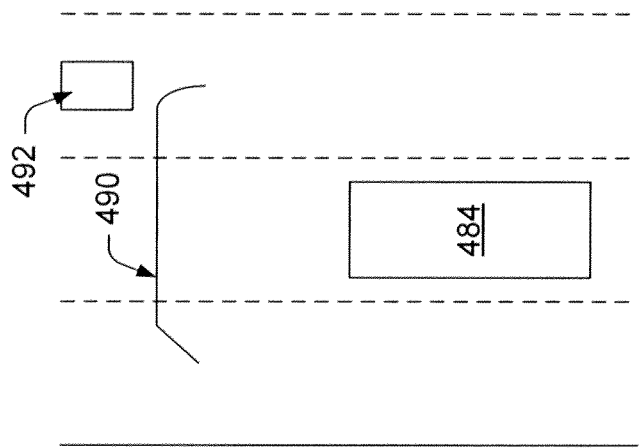
FIG. 14B shows an asymmetric FDLS that can be employed when a target vehicle or the like is detected in front of the host vehicle.
Figure 14A:
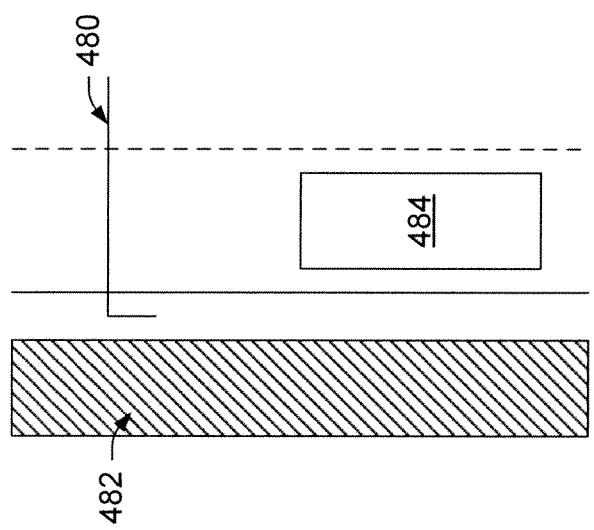
FIG. 14A shows an asymmetric FDLS that can be employed when a construction zone or the like is detected one a side of a host vehicle.

FIGS. 14A and 14B illustrate examples of asymmetric FDLSs that can be employed when certain trigger events are detected. FIG. 14A shows an asymmetric FDLS 480 that can be employed when a construction zone 482 or the like is detected on a side of a host vehicle 484. FIG. 14B shows an asymmetric FDLS 490 that can be employed when a target vehicle 492 or the like is detected in front of the host vehicle 484. Other trigger conditions for which an asymmetric FDLS can be employed include detection of a target vehicle while the host vehicle is in a curve (as described herein), dense traffic (e.g., above a predetermined threshold), detection of erratic target vehicles, detection of construction barriers, GPS information (curved, sloped roads vs. flat and/or straight roads), etc.

FIGS. 15A and 15B illustrate examples of symmetric FDLSs that can be employed when certain trigger events are detected. FIG. 15A shows a symmetric FDLS 500 that can be employed when no trigger events are detected by the host vehicle 484. FIG. 15B shows a symmetric FDLS 510 that can be employed when an ABS, traction, and/or stability event is detected by the host vehicle 484. Other trigger conditions for which a symmetric FDLS can be employed include detection of a target vehicle while the host vehicle is in a curve (as described herein), dense traffic (e.g., above a predetermined threshold), detection of erratic target vehicles, detection of construction barriers, GPS information (curved, sloped roads vs. flat and/or straight roads), adverse weather conditions, road conditions (e.g., slippery roads having a friction coefficient below a predetermined threshold, etc.) etc.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. An adaptive cruise-with-braking (ACB) system that facilitates modifying or adjusting a braking reaction distance as a function of a detected trigger event, comprising:
    a sensor on a host vehicle that detects a forward vehicle;
    a deceleration system that executes one or more deceleration requests;
    a controller having a memory that stores, and a processor that executes, computer-executable instructions for:
        setting an initial braking reacting distance (BRD);
        defining a following distance limit shape (FDLS) as a function of a lateral offset function;
        monitoring one or more trigger conditions;
        detecting a trigger event;
        at least one of:
            adjusting the BRD by a predetermined distance; and
            adjusting the shape of the FDLS;
    as a function of the type of trigger event detected;

prior to detection of the trigger event, restricting foundation braking while permitting dethrottling and engine retardation; and permitting foundation braking after detection of the trigger event.

2. The system according to claim 1, wherein the sensor includes at least one of a camera sensor and one or more radar sensors.

3. The system according to claim 1, wherein the FDLS comprises a lateral portion that is coincident with the BRD, and two longitudinal portions that extend from the lateral portion toward the host vehicle along a path defined by the lateral offset function.

4. The system according to claim 1, wherein a deceleration request is limited to request activation of at least one of a dethrottling module and an engine retarder when the forward vehicle has a lateral offset greater than or equal to a lateral offset defined by the lateral offset function.

5. The system according to claim 1, wherein restrictions on a deceleration request are removed to permit activation of foundation brakes when the forward vehicle has a lateral offset that is within the FDLS defined by the lateral offset function.

6. The system according to claim 1, wherein the computer-executable instructions further comprise:
    detecting the trigger event by comparing a measured value for the one or more monitored trigger conditions to a respective corresponding predetermined threshold value for each of the respective trigger conditions; and
    the predetermined distance being dependent on the type of trigger event detected.

7. The system according to claim 1, wherein the one or more monitored trigger conditions comprise one or more of:
    a system fault condition;
    input from a tire pressure monitoring system;
    at least one of current and recent velocities of vehicles in the same or neighboring lanes as the host vehicle;
    at least one of current and recent accelerations of vehicles in the same or neighboring lanes as the host vehicle; and
    road terrain determined from global positioning system (GPS) information.

8. The system according to claim 1, wherein the one or more monitored trigger conditions comprises road surface conditions.

9. The system according to claim 1, wherein the one or more monitored trigger conditions comprises traffic density conditions.

10. The system according to claim 1, wherein the one or more monitored trigger conditions comprises activation of one or more of an antilock brake system (ABS), a traction control system, and a stability control system in the host vehicle.

11. The system according to claim 1, wherein a BRD reduction for a given trigger event is proportional to a weight assigned to the given trigger event, such that different trigger events result in BRD reductions of different magnitudes.

12. The system according to claim 1, further comprising a driver interface that receives from the ACC, and presents to the driver, an alert when one or both of the BRD and the FDLS are adjusted.

13. A method for modifying or adjusting a braking reaction distance as a function of a detected trigger event, comprising:
    setting an initial braking reacting distance (BRD);
    defining a following distance limit shape (FDLS) as a function of a lateral offset function;
    monitoring one or more trigger conditions;
    detecting a trigger event;
    at least one of:
        adjusting the BRD by a predetermined distance; and
        adjusting the shape of the FDLS;
    as a function of the type of trigger event detected;
        prior to detection of the trigger event, restricting foundation braking while permitting dethrottling and engine retardation; and
    permitting foundation braking after detection of the trigger event.

14. The method according to claim 13, further including:
    detecting the trigger event by comparing a measured value for the one or more monitored trigger conditions to a respective corresponding predetermined threshold value for each of the respective trigger conditions; and
    the predetermined distance being dependent on the type of trigger event detected.

15. The method according to claim 13, wherein the FDLS comprises a lateral portion that is coincident with the BRD, and two longitudinal portions that extend from the lateral portion toward the host vehicle along a path defined by the lateral offset function.

16. The method according to claim 13, further comprising limiting a deceleration request to request activation of at least one of a dethrottling module and an engine retarder when the forward vehicle is outside of the FLDS defined by the lateral offset function.

17. The method according to claim 13, further comprising removing restrictions on a deceleration request to permit a request for activation of foundation brakes when the forward vehicle is within the FDLS defined by the lateral offset function.

18. The method according to claim 13, wherein the one or more monitored trigger conditions comprise one or more of:
    a system fault condition;
    activation of one or more of an antilock brake system (ABS), a traction control system, and a stability control system in the host vehicle;
    road surface conditions;
    input from a tire pressure monitoring system;
    traffic density conditions;
    at least one of current and recent velocities of vehicles in the same or neighboring lanes as the host vehicle;
    at least one of current and recent accelerations of vehicles in the same or neighboring lanes as the host vehicle; and
    road terrain determined from global positioning system (GPS) information.

19. The method according to claim 13, further comprising assigning weights to each trigger event type, wherein a BRD reduction for a given trigger event is proportional to a weight assigned to the given trigger event, such that different trigger events result in BRD reductions of different magnitudes.

20. A processor or computer-readable medium programmed to perform the method of claim 13.

* * * * *